United States Patent [19]

MacMunn

[11] Patent Number: 4,772,837
[45] Date of Patent: Sep. 20, 1988

[54] APPARATUS AND METHOD FOR CONTROLLING LINEAR MOTORS

[75] Inventor: George D. MacMunn, Southfield, Mich.

[73] Assignee: Jervis B. Webb Company, Farmington Hills, Mich.

[21] Appl. No.: 34,009

[22] Filed: Apr. 2, 1987

[51] Int. Cl.$^4$ .............................................. G05B 11/00
[52] U.S. Cl. ..................................... 318/687; 318/603; 318/599; 318/135
[58] Field of Search ................ 318/687, 135, 282, 603, 318/600, 601, 561, 599

[56] References Cited

U.S. PATENT DOCUMENTS

| | | | |
|---|---|---|---|
| 4,381,478 | 4/1983 | Saiso et al. | 318/687 X |
| 4,463,300 | 7/1984 | Mayne | 318/687 |
| 4,590,411 | 5/1986 | Kelly | 318/687 |
| 4,677,354 | 6/1987 | Pascal et al. | 318/687 |

Primary Examiner—Benjamin Dobeck
Attorney, Agent, or Firm—Joseph W. Farley

[57] ABSTRACT

A reciprocatable shuttle employed to advance a variable number of article carriers through successive work stations is driven on forward and return movements by a plurality of energizable linear motor stators for which the shuttle forms a common reactor. Energization of the stators is controlled by a programmable logic contoller in response to inputs from velocity measuring circuits which determine the difference in the actual velocity of the shuttle relative to a desired maximum forward velocity, return velocity and creep velocity; to inputs from distance measuring curcuits which determine the distance travelled by the shuttle relative to a forward deceleration point and to a return deceleration point; to inputs which establish the return or forward position of the shuttle; and, to inputs which count the number of article carriers to be advanced. The programmable logic causes the stators to be progressively energized at timed intervals in response to a velocity ON signal to accelerate the shuttle to that velocity; to maintain the shuttle at that velocity; and, in response to a distance signal, to reversely energize the stators until the shuttle reaches the creep velocity. The maximum number of stators energizable is limited in accordance with the article carrier count, and the sequence in which the stators are energized is rotated on each forward-advance movement cycle of the shuttle.

20 Claims, 5 Drawing Sheets

APPARATUS AND METHOD FOR CONTROLLING LINEAR MOTORS

SUMMARY OF THE INVENTION

This invention relates to improvements in a velocity control for linear electric motors; and particularly to an improved apparatus and method for controlling the energization of plural motor stators of the linear type employed to drive a common reactor.

Where a plurality of linear motor stators, or thrusters are employed to drive a common movable element, or reactor, conventional methods of controlling the energization of the stators have certain disadvantages.

A typical on-off type of control, responsive to the velocity of the movable element, causes all stators to be energized on a velocity requirement signal regardless of whether that signal is produced during acceleration of the movable element, or is produced when the speed of the movable falls below a desired speed; resulting in the movable element being driven with short hard thrusts and causing vibration and hammering.

A thrust modulated control has been used in which the thrust produced by the stators is regulated using thyristors to adjust the voltage applied and appropriate speed sensing circuitry to control the thyristors. However, this method is expensive and complicated.

A variable frequency type of control is possible but is not suitable at low speeds of the movable member because of the mechanical limitation on the minimum spacing between the electrical pole faces of the linear motor stators.

The control problem, where multiple stators are employed to drive a common reactor, is further complicated if the reactor propels a variable load.

In the control of the present invention for a linear motor having a movable reactor element and one or more electrically energizable stator elements, an encoder device driven by the movable element is employed to produce a pulsed output voltage, the period of each encoder voltage pulse being proportional to the velocity of the movable element, and the number of encoder voltage pulses being proportional to the distance travelled by the movable element. The pulsed encoder output voltage is supplied to a velocity measuring circuit and to a distance measuring circuit.

Basically, the velocity measuring circuit generates, in response to each encoder voltage pulse, a reference voltage pulse having a duration proportional to a desired velocity of the movable element; compares the period of the encoder voltage pulse to the duration of the reference voltage pulse; and produces energizing and deenergizing velocity signals in response to the duration of the reference voltage pulse being respectively less and greater than the period of the encoder voltage pulse. This basic arrangement can be duplicated to provide velocity signals for different desired velocities.

The distance measuring circuit counts the number of encoder voltage pulses, compares the counted number with a reference number indicative of a desired distance travelled by the movable element, and produces a distance signal in response to coincidence between the two numbers. Again, this arrangement can be duplicated to provide distance signals for different desired distances.

A programmable controller receives a velocity signal or signals from the velocity measuring circuit, a distance signal or signals from the distance measuring circuit, and employs these signals together with any other desired logic inputs to control the energization of the stator element or elements. In the embodiment of the invention to be disclosed, the movable element is a reciprocatable shuttle driven by a plurality of stator elements on forward and reverse movements between a return position and a forward position, and employed to advance a variable number of article carriers through a plurality of successive work stations. Velocity circuit signal inputs to the programmable controller comprise a first velocity signal indicating the velocity of the movable element relative to a desired maximum velocity on a forward movement thereof, a second velocity signal indicating the velocity of the movable element relative to a desired maximum velocity on a return movement thereof, and a third velocity signal indicating the velocity of the movable element relative to a desired creep velocity at the terminal portion of a forward or return movement. Distance circuit signal inputs to the programmable controller include a first distance signal indicating a desired distance travelled by the movable element from its return position to a deceleration point on a forward movement and a second distance signal indicating a desired distance travelled by the movable element to a deceleration point on a return movement. Other logic inputs to the programmable controller include a signal indicating that the movable element is in return position, a signal that the movable element is in forward position, and signals indicating the number of article carriers in the work stations.

These various signal inputs are utilized by the programmable controller logic in the following manner:

1. In response to a return position signal and on external command, the stator elements are progressively forwardly energized in response to the first velocity signal at timed intervals until the movable element attains maximum forward velocity. The number of stator elements energized is limited in accordance with the number of article carriers being propelled.

2. In response to the first distance signal the stator elements are progressively reversely energized at timed intervals to decelerate the movable element. Then, in response to the third, creep velocity signal, reverse energization of the stator elements is discontinued, and limited forward energization thereof is resumed, as required to maintain the movable element at creep velocity until a forward position signal is received.

3. Control of a return movement of the movable element is accomplished in the same manner, but in response to the second velocity and distance signals.

Another preferred feature is that the programmable controller includes ring counter logic, which in response to the completion by the movable element of a forward-return movement cycle, rotates or changes the sequence in which the stator elements will be progressively energized on the next forward-return movement cycle. This distributes the work load among the stator elements, limiting the heat procced and absorbed by any one of them.

Other features and advantages of the invention will appear from the description to follow of the embodiments shown in the accompanying drawings.

DESCRIPTION OF THE EMBODIMENTS

Figure 1:
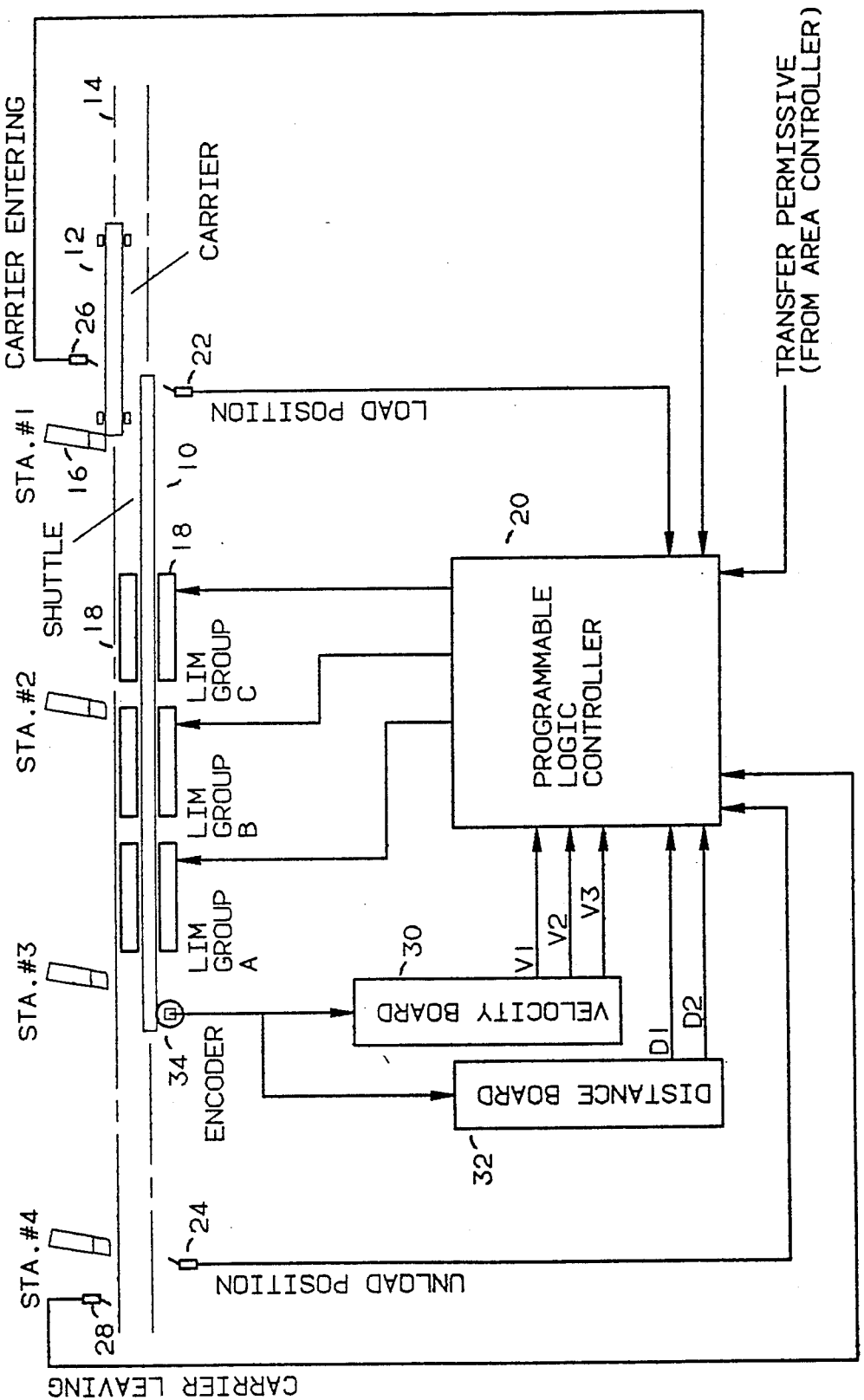
FIG. 1 is a schematic diagram of a control of the invention for a plurality of linear motor stators which reciprocatably drive a shuttle that advances article carriers through successive work stations.

In FIG. 1, a reciprocatable shuttle 10 forms a common reactor for a plurality of linear motor stators (LIM's) which are arranged on opposite sides of the shuttle 10 in groups A, B and C, and which drive the shuttle 10 on forward and return movements The shuttle 10 is employed to article carriers 12 through successive work stations STA. 1 to STA. 4, with the forward and reverse movements of the shuttle 10 being substantially equal to the distance from one work station to the next successive work station. A conveyor, indicated by the broken line 14, propels a carrier 12 to STA. 1, picks up a carrier 12 at STA. 4, and each of the stations includes a stopping device 16 for positioning a carrier thereat.

Representative mechanical details of an arrangement of this type appear in U.S. Pat. No. 4,574,706 and are incorporated herein by reference. Another shuttle arrangement of this general type is disclosed in commonly owned, co-pending allowed U.S. application Ser. No. 06/607,199 now U.S. Pat. No. 4,669,388 to which reference is also made. In general, in these arrangements, the reactor portion of the shuttle consists of an aluminum beam movably supported between an opposed pair of stators 18 forming one of the LIM groups; carried by the shuttle is suitable mechanism for engaging and propelling the carriers 12 on a forward movement of the shuttle, with this mechanism being disengaged from the carriers on a return movement of the shuttle.

Figure 2:
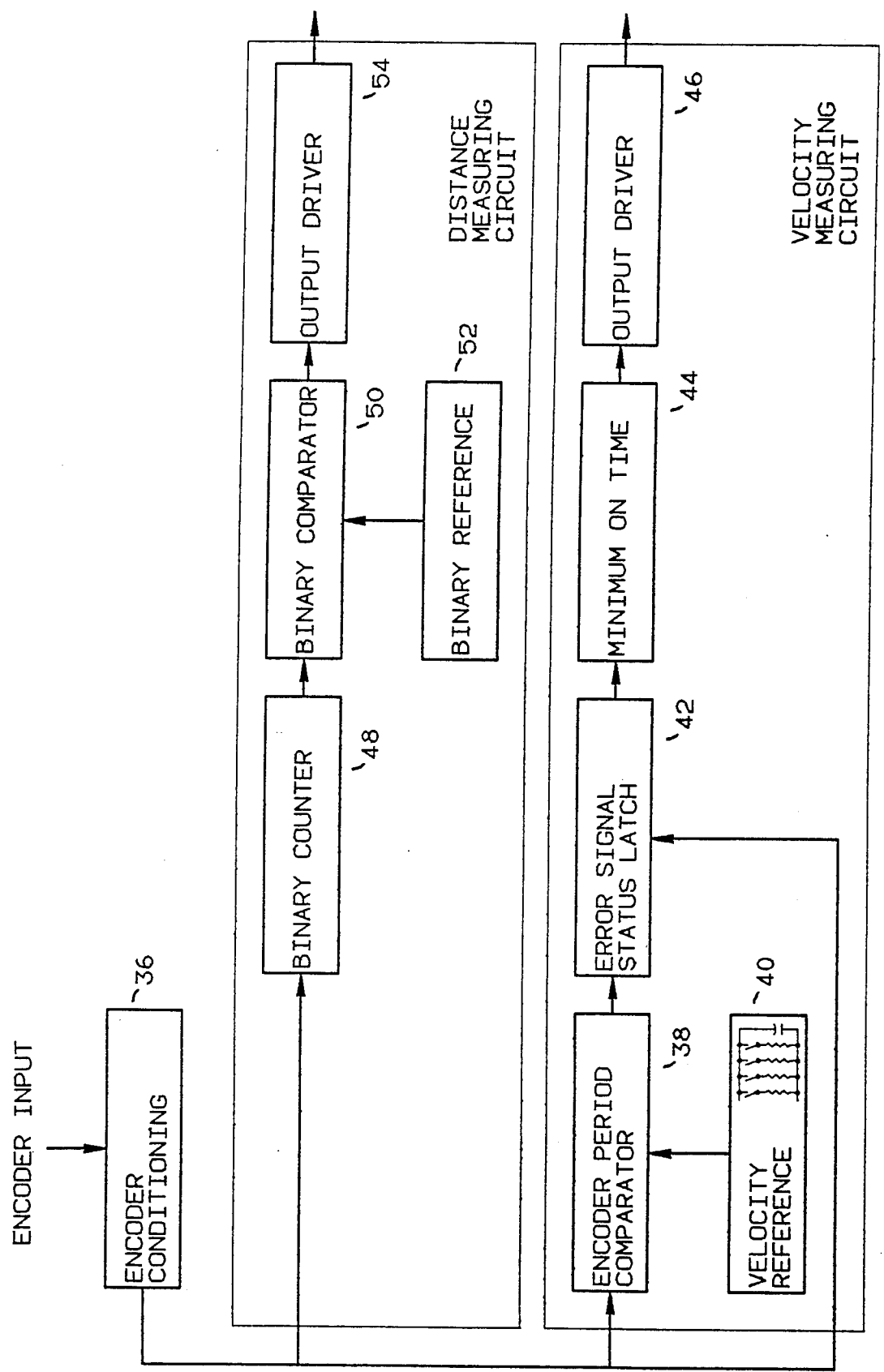
FIG. 2 is a block diagram showing components of a distance measuring circuit and a velocity measuring circuit of the control FIG. 1.

The control of FIG. 1 includes a programmable logic controller 20 that regulates the firing of conventional solid state relays (not shown) for energizing the stators 18 of the LIM groups in accordance with the condition of certain input signals, as follows:

1. a return, or load position signal from a limit switch 22 actuated by the shuttle 10;
2. a forward, or unload position signal from a limit switch 24 actuated by the shuttle 10;
3. carrier entering and carrier leaving signals from carrier actuated limit switches 26 and 28, respectively;
4. velocity signals V1, V2 and V3 from a velocity measuring circuit 30, further shown in FIG. 2; and
5. distance signals D1 and D2 from a distance measuring circuit 32, further shown in FIG. 2.

The velocity and distance signals are derived in part from encoder means 34, a device which includes a rotatable wheel frictionally driven by the shuttle 10 and which produces a pulsed output voltage in response to movement of the shuttle 10. The period of each output voltage pulse is proportional to the velocity of the shuttle 10; the number of output voltage pulses is proportional to the distance travelled by the shuttle 10. This output voltage is supplied to the velocity and to the distance measuring circuits 30 and 32 which are described below.

Velocity Measuring Circuit

Figure 5:
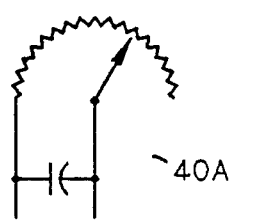
FIG. 5 is a diagram illustrating an alternative form of a velocity reference circuit.

FIG. 2 schematically shows the circuit elements required for any one of the velocity signals V1, V2 or V3. The pulsed encoder output voltage signal is fed to an encoder conditioning unit 36 such as a high gain split Darlington optoisolator which removes undesired electrical noise or transient signals and obtains a clean pulsed encoder output voltage signal. This encoder output voltage is supplied to an encoder period comparator 38, a dual monostable multivibrator. The first section of the comparator 38 produces a constant short negative delay pulse on each positive transition of the encoder pulse to move the logic test away from a time zero datum and minimize spurious results. The second section of the comparator 38 is triggered by the positive transition of each delay pulse to generate a reference voltage pulse having a duration proportional to a desired velocity, the duration being determined by velocity setting means in the form of an RC circuit 40. This circuit preferably comprises a plurality of resistors of different values which can be selectively connected by switches in parallel with a capacitance, and the duration of the reference voltage pulse equals the total selected resistance in Ohms times the capacitance in Farads. Alternatively, the RC circuit may be of the type shown by the circuit 40A in FIG. 5, employing a variable resistance which can be changed as and when desired.

The duration of the reference voltage pulse is compared to the period of the encoder voltage pulse to produce an energizing or deenergizing-signal at the error signal element 42, a flip-flop circuit, depending on whether the duration of the reference voltage pulse is less or greater than the period of the encoder voltage pulse.

If the reference voltage pulse duration is less than the encoder voltage pulse period, indicating that the velocity of the shuttle 10 is low and that a velocity energizing signal is required, the output of the error signal element 42 triggers the minimum on time element 44 to generate a holding signal, on the next encoder pulse. Element 44 may be a monostable multivibrator similar to the comparator 38. The holding signal prevents the generation of a velocity deenergizing signal for a minimum time period at least equal to the time required to energize one of the LIM groups.

If the reference voltage pulse duration is greater than the encoder voltage pulse period, indicating that the velocity of the shuttle is high and that a velocity deenergizing signal is required, the output of the error signal element 42 does not effect the minimum on time element 44, and is transferred to the output driver element 46, which may be a dual NAND buffer/driver.

Driver element 46 produces an ON or an OFF signal which is supplied to the programmable controller 20.

It will be understood the the VELOCITY BOARD shown in FIG. 1 includes the velocity measuring circuit elements described above for each of the velocity outputs V1, V2 and V3. Output V1 is an ON or OFF signal indicating that the speed of the shuttle 10 is below or above a maximum desired velocity on a forward movement; output V3 is an ON or OFF signal indicating that the speed of the shuttle 10 is below or above a maximum desired velocity on a return movement; and output V2 is an ON or OFF signal indicating that the speed of the shuttle 10 is below or above a creep velocity desired at the terminal portion of a forward or return movement.

Distance Measuring Circuit

Encoder voltage pulses (which may be scaled according to the desired degree of resolution) are fed to a ripple carry binary counter 48 which advances one count on the negative transition of each pulse. A binary comparator 50, such as a multi-Bit magnitude comparator, has one set of inputs which receive the output from the counter 48 and another set of inputs connected to toggle switches represented by the binary reference element 52 and which establish a reference pulse value or count. When the counted pulse input equals or exceeds the reference, the output of the comparator 50 changes from low to high and is received by an output driver 54, a non-inverting buffer, which supplies a distance signal to the programmable controller 20.

Two such distance measuring circuits are employed in the DISTANCE BOARD of FIG. 1. The circuit produces a D1 output signal when the distance travelled by the shuttle 10 from the return position on a forward movement equals a distance to a desired deceleration point. The second circuit produces a D2 output signal when the distance travelled by the shuttle 10 from the forward position on a return movement equals the distance to a desired deceleration point.

Programmable Logic Controller

The programmable logic controller software gates the outputs that control the firing of solid state relays which energize the LIM GROUPS A, B and C shown in FIG. 1. The logical gating of these outputs is based on the condition of input signals from the load or return position limit switch 22, the unload or forward position limit switch 24, the carrier entering and leaving limit switches 26 and 28, the outputs V1, V2 and V3 from the velocity measuring circuits, and the outputs D1 and D2 from the distance measuring circuits. The logic also determines the firing sequence of the LIM GROUPS, the maximum number of LIM GROUPS requred for a given load or carrier count and the staged or progressive energization of that maximum number of LIM GROUPS.

Figure 3A:
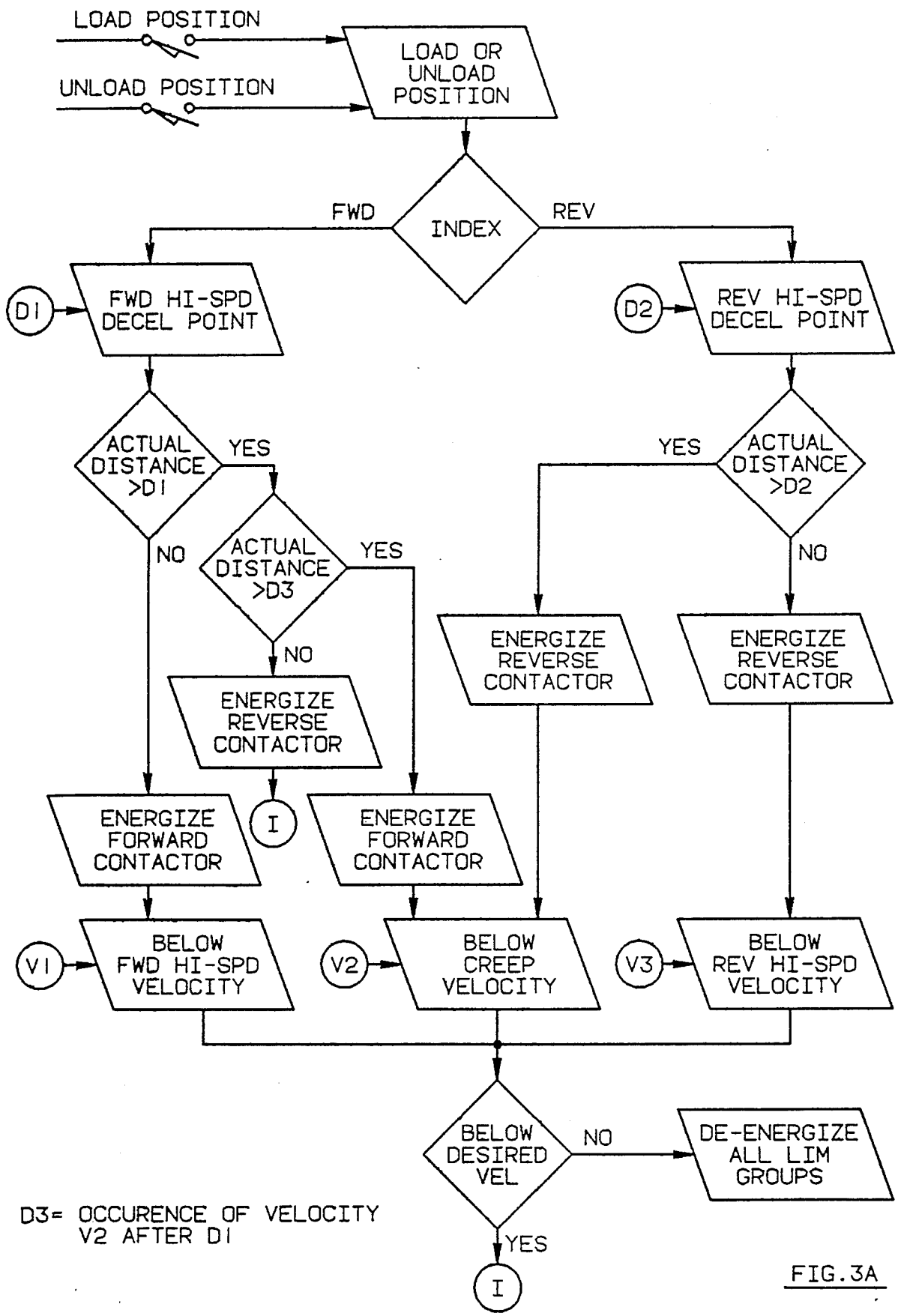
FIG. 3A is a portion of a logic diagram for the programmable controller of the control of FIG. 1.
Figure 3B:
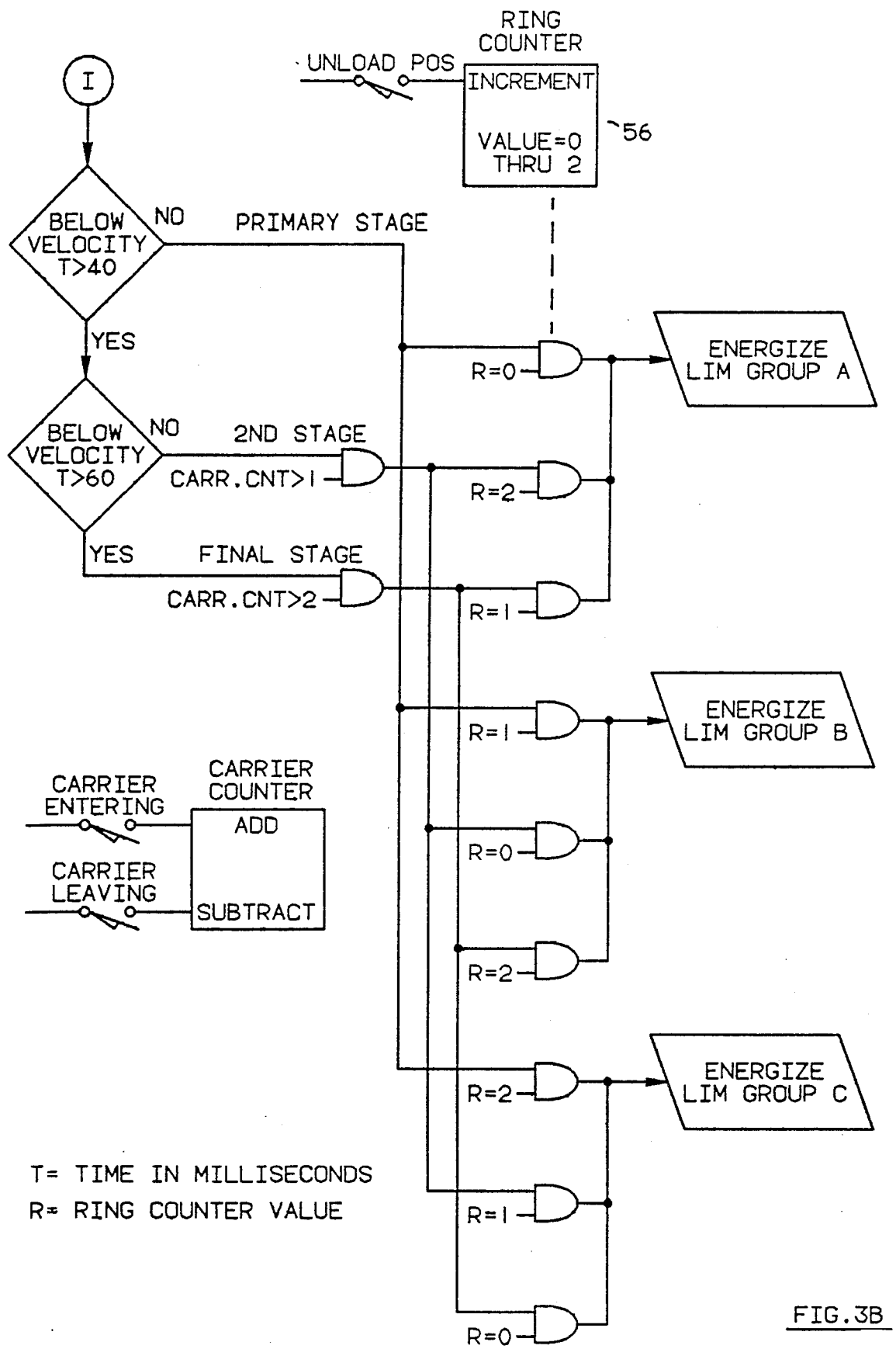
FIG. 3B is a continuation of the logic diamgram FIG. 3A.
Figure 4A:
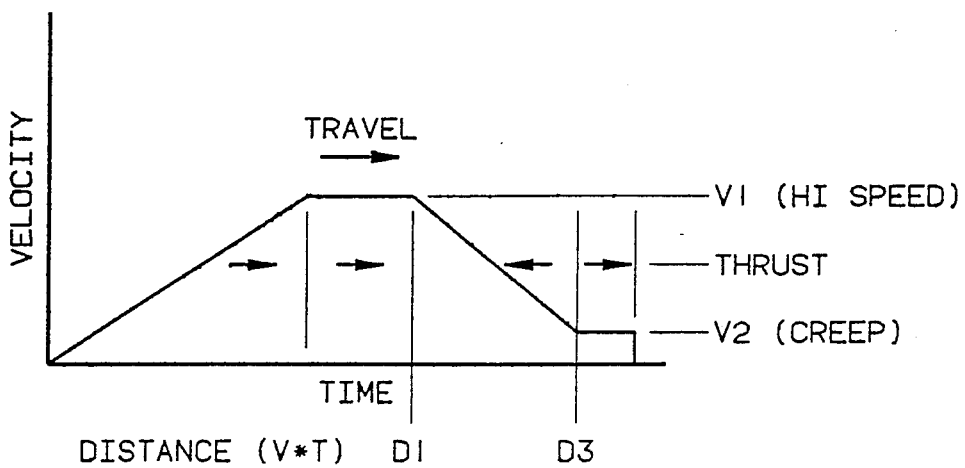
FIG. 4A is a representative velocity/time curve for a forward movement of the linear motor driven shuttle of FIG. 1.
Figure 4B:
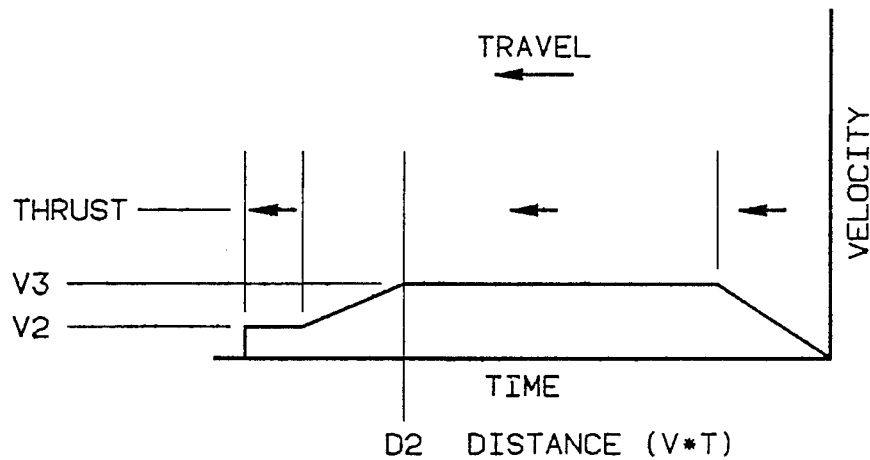
FIG. 4B is a representative velocity/time curve for a return movement of the shuttle of FIG. 1.

The sequence for a forward index movement of the shuttle 10 is illustrated by FIGS. 3A, 3B and 4A. Engagement of the return or load position limit switch 22 by the shuttle 10 indicates that a forward movement can be implemented, and is initiated by a transfer permissive signal (FIG. 1) to the programmable controller 20. The forward contactor is energized and the LIM GROUPS are energized progressively in timed intervals as required to accelerate the shuttle 10 to velocity V1 and to maintain the shuttle at that velocity until it reaches the deceleration point and a D1 signal is produced. A D1 signal causes the reverse contactor to be energized and the LIM GROUPS to be reversely energized progressively in timed intervals until the shuttle 10 has decelerated to creep velocity V2, which causes the controller to compute a distance D3. At distance D3, the reverse contactor is deenergized, the forward contactor is energized and creep velocity is maintained by the modulation of input V2 until the shuttle 10 actuates the unload or forward limit switch 24 causing the forward contactor to be deenergized and completing the forward index movement.

A return index movement sequence is similar except that the LIM GROUPS are progressively energized in timed sequence to accelerate the shuttle 10 to velocity V3, and to maintain the shuttle at that velocity by the modulation of input V3 until a D2 input is received, reversing the energization of the LIM GROUPS to decelerate the shuttle 10 to creep velocity V2. Creep velocity is maintained by the modulation of input V2 until the shuttle 10 actuates the load or return position limit switch 22, deenergizing the reverse contactor and completing the return index movement.

FIG. 3B illustrates the combined time and carrier count logic employed for progressively energizing the LIM GROUPS in response to a velocity ON signal. If that velocity signal is still true 40 milliseconds after the primary LIM GROUP has been energized, the second LIM GROUP is energized if the carrier 12 count is greater than one; and if that velocity signal is still true 60 milliseconds after the primary LIM GROUP has been energized, the third LIM GROUP is energized if the carrier 12 count is greater than two. When the velocity signal goes OFF, all energized LIM GROUPS are deenergized. This energization logic results in relatively constant acceleration and deceleration of the shuttle 10 under varying load conditions, and the time delay logic compensates for the reduced amount of thrust required after the shuttle 10 has reached a desired velocity.

As also illustrated by FIG. 3, the programmable controller 20 includes a ring counter 56 which rotates the assignment of the LIM GROUPS A, B and C to the primary, secondary and final energization stages. The ring counter 56 is indexed one count on each cycle of return-forward movements of the shuttle 10 in response to an input from the unload or forward position limit switch 24.

Those skilled in the art will appreciate that the disclosed embodiments of the invention can readily be adapted to the control of different numbers of linear motors and to other operational requirements.

I claim:

1. A control for a linear motor having a reactor element and an electrically energizable stator element one of which elements is movable relative to the other, said control comprising:
    encoder means for producing a pulsed output voltage in response to movement of said movable element, the period of each encoder voltage pulse being proportional to the velocity of the movable element;
    velocity reference means for generating in response to each encoder voltage pulse a reference voltage pulse having a duration proportional to a desired velocity of the movable element;
    comparator means for comparing the period of the encoder voltage pulse to the duration of the reference voltage pusle; and
    driver means connected to said comparator means for producing energizing and deenergizing velocity signals for said stator element in response to the duration of the reference voltage pulse being respectively less and greater than the period of the encoder voltage pulse.

2. A control according to claim 1 wherein said driver means includes means for delaying the production of a deenergizing signal for a time at least equal to the time required to energize said stator.

3. A control according to claim 2 wherein said velocity reference means is capable of generating a plurality of reference voltage pulses each having a duration proportional to a different desired velocity of the movable element, and means for selecting one of said reference voltage pulses for comparison with the period of the encoder voltage pulse.

4. A control according to claim 1 further comprising velocity setting means for selectively varying the duration of said reference voltage pulse.

5. A control according to claim 1 wherein the duration of said reference voltage pulse is determined by an RC circuit in said velocity reference means.

6. A control according to claim 5 wherein at least one of the resistance and capacitance components of said RC circuit is selectively variable.

7. A control according to claim 1 further comprising counter means for counting the encoder voltage pulses produced by said encoder means whereby the distance travelled by said movable one of said elements is determinable.

8. A control according to claim 7 further comprising distance measuring means for producing a distance signal in response to coincidence between the encoder voltage pulses counted by said counter means and a reference value indicative of a desired distance travelled by the movable one of said elements.

9. A control according to claim 8 further comprising programmable controller means responsive to said velocity signals for energizing said stator element as required to accelerate said movable element to said desired velocity in a programmed time interval, said programmable controller being responsive to said distance signal for reversely energizing said stator element.

10. In a shuttle carriage adapted to advance a plurality of articles through successive work stations, and linear motor means for reciprocatably driving the shuttle carriage on forward and reverse movements including a plurality of electrically energizable stators, control means for regulating the energization of said stators in response to the velocity and position of said shuttle carriage during the forward and reverse movements thereof, said control means comprising;
  encoder means for producing a pulsed output voltage in response to movement of said shuttle carriage, each encoder voltage pulse having a period proportional to the velocity of the shuttle carriage;
  velocity reference means for generating in response to each encoder voltage pulse a reference voltage pulse having a duration proportional to a desired velocity of the shuttle carriage;
  comparator means for comparing the period of each encoder voltage pulse to the duration of each reference voltage pulse;
  output means connected to said comparator means for producing energizing and deenergizing velocity signals in response to the duration of the reference voltage pulse being respectively less and greater than the period of the encoder voltage pulse;
  distance measuring means including means for counting the encoder voltage pulses produced by said encoder means and generating a distance signal in response to a comparison between the counted number and a reference number indicative of a desired distance travelled by said shuttle carriage;
  and programmable controller means responsive to said velocity signals for progressively energizing the number of said stators required to accelerate said shuttle carriage to said desired velocity, to maintain said shuttle carriage at said desired velocity, and to decelerate said shuttle carriage in response to said distance signal.

11. Shuttle carriage control means according to claim 10 wherein said output means includes means for establishing a minimum on time period for an energizing velocity signal, said time period being at least equal to the time required to energize one of said stators.

12. Shuttle carriage control means according to claim 10, further comprising means for determining the number of articles to be advanced by said shuttle carriage, and said programmable controller means is responsive to a signal indicative of the determined number of articles for limiting in accordance therewith the number of said stators activated.

13. Shuttle carriage control means according to claim 10 wherein said velocity reference means generates in response to each encoder voltage pulse a second reference voltage pulse having a duration proportional to a desired creep velocity of said shuttle carriage, said comparator means and said output means respectively compare the period of each encoder voltage pulse with said second reference voltage pulse and produce energizing and deenergizing creep velocity signals, and said programmable controller means is responsive to said creep velocity signals to maintain said shuttle carriage at creep velocity following deceleration of said shuttle carriage in response to said distance signal.

14. Shuttle carriage control means according to claim 13 further comprising sensing means for supplying to said programmable controller means a signal indicative of a forward position of said shuttle carriage and a signal indicative of a return position of said shuttle carriage, said programmable controller means being responsive to said forward and said return position signals for energizing said stators to drive said shuttle carriage on a return movement and on a forward movement, respectively.

15. Shuttle carriage control means according to claim 14 wherein said velocity reference means generates in response to each encoder voltage pulse a third reference voltage pulse having a duration proportional to a desired return velocity of said shuttle carriage, said comparator means and said output means respectively compare the period of each encoder voltage pulse with said third reference voltage pulse and produce energizing and deenergizing return velocity signals, and said programmable controller means is responsive to said forward position signal and to said return velocity signals for progressively energizing the number of said stators required to accelerate said shuttle carriage to said desired return velocity.

16. Shuttle carriage control means according to claim 15 wherein said distance measuring means generates a second distance signal in response to a comparison between the counted number of said encoder voltage pulses and a second reference number indicative of a desired distance travelled by said shuttle carriage on a return movement, said programmable controller means being responsive to said second distance signal to decelerate said shuttle carriage on return movement thereof.

17. Shuttle carriage control means according to claim 16 wherein said programmable controller means includes timing means for controlling the progressive energization of said stators at desired intervals.

18. A method of controlling the energization of a plurality of linear motor stator elements arranged to reciprocatally drive a common movable reactor element on forward and reverse movements between a forward position and a return position, comprising the steps of:
   a. detecting the forward or return position of the reactor element;
   b. establishing a desired forward velocity, a desired reverse velocity, and a desired creep velocity of the reactor element;
   c. establishing a desired forward distance from said return position to a deceleration point for forward movement of said reactor element, a desired return distance from said forward position to a deceleration point for reverse movement of said reactor element, and a travel distance of said reactor element to a point of creep velocity;
   d. initiating on command a forward or reverse movement of said reactor element in response to the detection of said return or forward position, respectively;
   e. periodically measuring the instantaneous velocity of said reactor element and comparing said measured velocity with said established forward velocity during forward movement of said reactor element, and with said established reverse velocity during reverse movement of said reactor element;
   f. generating forward and reverse velocity signals, respectively, in response to the difference between said measured velocity and said established velocity;
   g. employing said forward or said reverse velocity signal, respectively, for progressively energizing said stator elements to accelerate said reactor element to said desired forward or reverse velocity, and for limiting the number of stator elements energized when said reactor element has attained its desired velocity;
   h. measuring the distance travelled by said reactor element;
   i. comparing the measured distance with said established forward or return distance during forward or reverse movement of the reactor element, respectively, and with said travel distance to a point of creep velocity, and generating in response to correspondance between the measured and established distance a forward deceleration point signal, a reverse deceleration point signal, and a creep velocity point signal;
   j. reversing the energization of said stator elements in response to said forward or said reverse deceleration point signal, comparing the measured velocity with the established creep velocity for generating a creep velocity signal, controlling the energization of said stator elements to drive said reactor element at creep velocity, and deenergizing said stator elements in response to said reactor element reaching said forward position or said return position.

19. A method according to claim 18 wherein said reactor element is arranged to propel a variable number of load units, further comprising the steps of:
   determining the number of load units to be propelled, and restricting in accordance with the number of load units determined the number of stator elements energized for accelerating said reactor element.

20. A method according to claim 19 further comprising rotating the sequence in which said stator elements are energized on successive cycles of forward and return movements of said reactor element.

* * * * *

UNITED STATES PATENT AND TRADEMARK OFFICE
CERTIFICATE OF CORRECTION

PATENT NO. : 4,772,837
DATED : September 20, 1988
INVENTOR(S) : George D. MacMunn It is certified that error appears in the above-identified patent and that said Letters Patent are hereby corrected as shown below:

Column 2, line 5 - "reciprccatable" should read --reciprocat-able--

Column 2, line 60 - "procced" should read --produced--

Column 3, line 24 - "to article carriers" should read --to advance article carriers--

Signed and Sealed this

Fourteenth Day of February, 1989

Attest:

DONALD J. QUIGG

*Attesting Officer*  *Commissioner of Patents and Trademarks*